United States Patent
Kalasapur et al.

(10) Patent No.: US 8,166,159 B2
(45) Date of Patent: Apr. 24, 2012

(54) CREATING DYNAMIC SIGNATURES FOR VIRTUAL LOCATIONS

(75) Inventors: Swaroop Kalasapur, Santa Clara, CA (US); Doreen Cheng, San Jose, CA (US); Yu Song, Pleasanton, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 870 days.

(21) Appl. No.: 12/163,432

(22) Filed: Jun. 27, 2008

(65) Prior Publication Data
US 2009/0322517 A1    Dec. 31, 2009

(51) Int. Cl.
*G06F 15/16* (2006.01)
(52) U.S. Cl. ............ 709/224; 709/205; 455/456.1; 455/457
(58) Field of Classification Search .......... 709/223, 709/224, 204, 25, 205; 340/825.36, 825.49; 455/456.1–457
See application file for complete search history.

(56) References Cited

U.S. PATENT DOCUMENTS

| | | | |
|---|---|---|---|
| 7,305,245 B2 * | 12/2007 | Alizadeh-Shabdiz et al. | 455/456.6 |
| 2001/0022558 A1 * | 9/2001 | Karr et al. | 342/450 |
| 2005/0221844 A1 * | 10/2005 | Trethewey et al. | 455/456.6 |

OTHER PUBLICATIONS

Hightower et al., "Practical Lessons from Place Lab", IEEE Pervasive Computing Magazine, Sep. 2006, pp. 1, 32-39.

* cited by examiner

*Primary Examiner* — David Lazaro
(74) *Attorney, Agent, or Firm* — Beyer Law Group LLP

(57) ABSTRACT

In one embodiment, a method for forming location signatures for a device, the method comprising: retrieving information regarding one or more digital devices detected around the device during a first set time period; and creating a first signature for a location based on information regarding the one or more digital devices detected during the first set time period.

18 Claims, 9 Drawing Sheets

| | |
|---|---|
| 102 | 00:00:00:00:00:00 |
| 104 | 00:13:70:6B:FD:5B |
| 106 | 00:16:41:9C:AD:FB |
| 107 | 00:16:41:95:62:13 |
| 109 | 00:17:5C:01:4D:04 |
| 110 | 00:16:41:95:22:EF |
| 112 | 00:16:41:95:5D:84 |
| 114 | 00:1A:8A:3A:42:03 |
| 115 | 00:12:D1:AE:8E:A7 |
| 116 | 00:05:4F:21:61:87 |
| 117 | 02:AE:63:04:C6:52 |

| | 402 | 404 | 406 | 408 |
|---|---|---|---|---|
| 11/12/2007 9:38 | WLAN | 102 107 109 110 112 | BT | 57 172 |
| 11/12/2007 9:40 | WLAN | 102 104 107 109 110 112 114 116 117 | BT | 57 172 |
| 11/12/2007 9:41 | WLAN | 102 107 109 110 112 116 117 | BT | 57 |
| 11/12/2007 9:42 | WLAN | 102 107 109 110 112 116 117 | BT | 57 |
| 11/12/2007 9:43 | WLAN | 102 107 109 110 112 117 | BT | 57 |
| 11/12/2007 9:45 | WLAN | 102 107 109 110 112 116 | BT | 57 |
| 11/12/2007 9:46 | WLAN | 102 107 109 110 112 | BT | 57 |
| 11/12/2007 9:47 | WLAN | 102 107 109 110 112 117 | BT | 57 |
| 11/12/2007 9:49 | WLAN | 102 106 107 109 110 112 114 115 116 117 | BT | 57 172 |
| 11/12/2007 9:50 | WLAN | 102 107 109 110 112 116 117 | BT | 57 172 |

FIG. 4

|     | 102 | 104 | 106 | 107 | 109 | 110 | 112 | 114 | 115 | 116 | 117 |
| --- | --- | --- | --- | --- | --- | --- | --- | --- | --- | --- | --- |
| 102 | 10 | 1 | 1 | 10 | 10 | 10 | 10 | 2 | 1 | 6 | 7 |
| 104 | - | 1 | 0 | 1 | 1 | 1 | 1 | 1 | 0 *504* | 1 | 1 |
|     | *502* | | | | | | | | | | |
| 106 | - | - | 1 | 1 | 1 | 1 | 1 | 1 | 1 | 1 | 1 |
| 107 | - | - | - | 10 | 10 | 10 | 10 | 2 | 1 | 6 | 7 |
| 109 | - | - | - | *500* | 10 | 10 | 10 | 2 | 1 | 6 | 7 |
| 110 | - | - | - | - | - | 10 | 10 | 2 | 1 | 6 | 7 |
| 112 | - | - | - | - | - | - | 10 | 2 | 1 | 6 | 7 |
| 114 | - | - | - | - | - | - | - | 2 | 1 | 2 | 2 |
| 115 | - | - | - | - | - | - | - | - | 1 | 1 | 1 |
| 116 | - | - | - | - | - | - | - | - | - | 6 | 6 |

FIG. 5

CREATING DYNAMIC SIGNATURES FOR VIRTUAL LOCATIONS

BACKGROUND OF THE INVENTION

1. Field of the Invention

The present invention relates to computing. More particularly, the present invention relates to the creation of dynamic signatures for virtual locations.

2. Description of the Related Art

There are many different applications that can benefit from the knowledge of user locations. While for many classes of applications, such as mapping programs or traffic monitoring, the physical location of the user is sufficient knowledge regarding the location of the user, there are some applications that would benefit from more advanced location information. For example, applications that utilize information about user habits to provide personalization support need information about a user's location that are at a finer granularity than just the physical address.

For example, there are applications where it is not enough to know the user's geographic position (e.g., longitude or latitude), but rather the applications need to know whether the application is important to the user and why (for example, that the user is home, or the user is at a favorite restaurant, etc.).

SUMMARY OF THE INVENTION

In one embodiment, a method for forming location signatures for a device, the method comprising: retrieving information regarding one or more digital devices detected around the device during a first set time period; and creating a first signature for a location based on information regarding the one or more digital devices detected during the first set time period.

In another embodiment, an apparatus is provided comprising: an environment sensor designed to detecting one or more digital devices around the apparatus; a location signature bank; and a signature manager coupled to the environment sensor and the location signature bank, wherein the signature manager is designed to store information received from the environment sensor in a device log, generate signatures for locations based on the information, and store the generated signatures in the location signature bank.

In another embodiment, a system for forming location signatures for a device is provided, the system comprising: means for retrieving information regarding one or more digital devices detected around the device during a first set time period; and means for creating a first signature for a location based on information regarding the one or more digital devices detected during the first set time period.

In another embodiment, a program storage device readable by a machine tangibly embodying a program of instructions executable by the machine to perform a method for forming location signatures for a device is provided, the method comprising: retrieving information regarding one or more digital devices detected around the device during a first set time period; and creating a first signature for a location based on information regarding the one or more digital devices detected during the first set time period.

BRIEF DESCRIPTION OF THE DRAWINGS

FIG. 3 is a table illustrating an example of system generated serial numbers of unique identifiers in accordance with an embodiment of the present invention. The figure illustrates the use of MAC IDs as device identifiers.

FIG. 4 is a table illustrating an example log as stored within a device log in accordance with an embodiment of the present invention.

FIG. 5 is a diagram illustrating an example co-occurrence matrix in accordance with an embodiment of the present invention.

DETAILED DESCRIPTION OF SPECIFIC EMBODIMENTS

Figure 1:
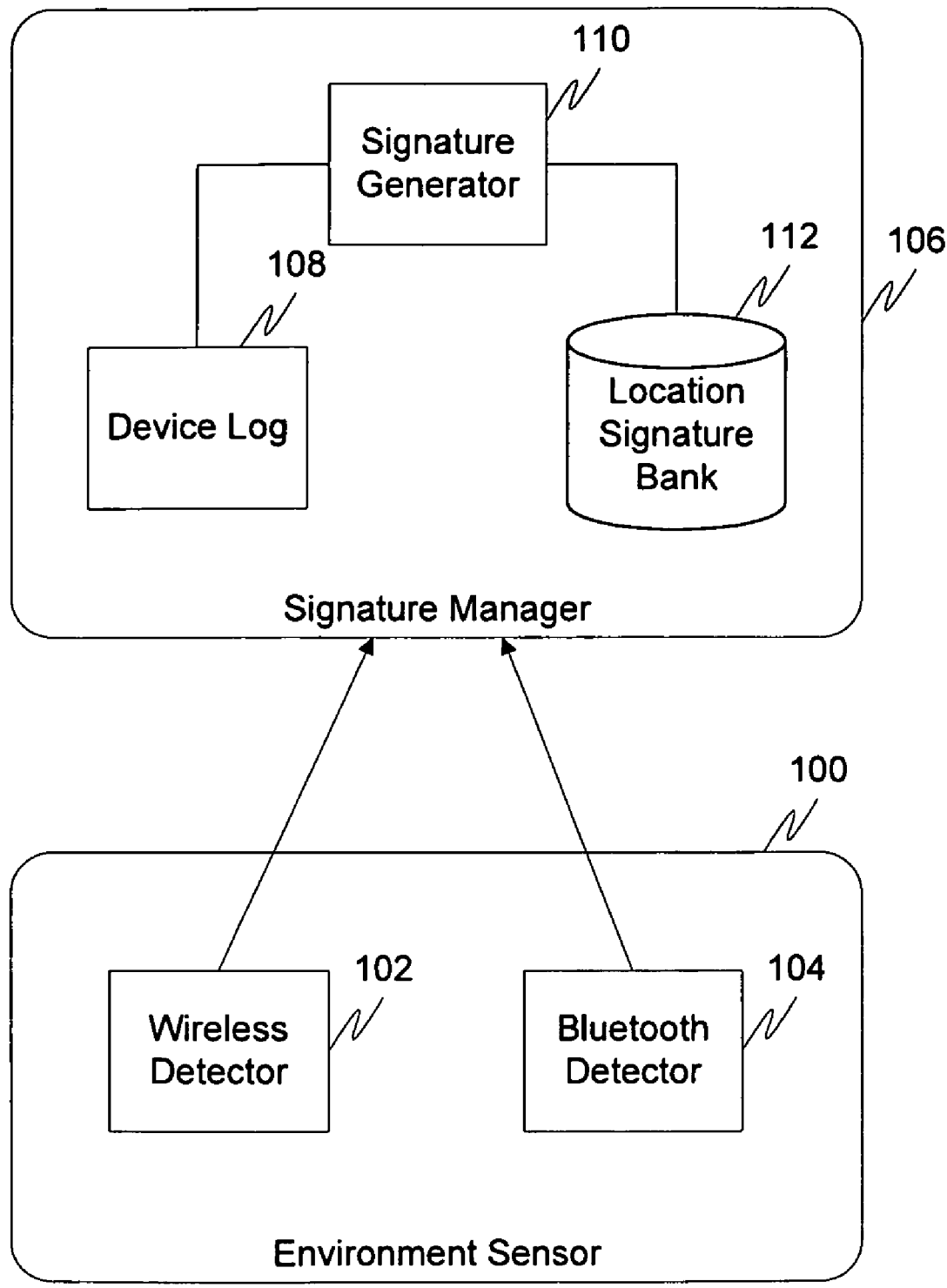
FIG. 1 is a block diagram illustrating an example architecture in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

One solution to providing information about user location is to collect visible wireless information such as WiFi access points and Bluetooth devices, and to form a location model for users based on the collected information. Clustering may be used as a means to identify locations of importance to the users. There are several drawbacks to this approach, however. First, it requires the number of important locations for a user be known a priori. This assumption is not realistic in most cases. Second, it is suitable for offline computation, but not online computation, due to the amount of processing required. Alternatively, a database comprising the WiFi access points and their respective locations can be built and utilized to lookup the location information. This solution, however, suffers from the requirement that such a database be built a priori and kept up to date. Moreover, this approach simply supplements the existing location sensors, such as GPS (described more below), and thus fails to provide personalization support to users. This limits the practical use of such a database.

Another solution to providing information about user location is to use a sensor-based system. These systems used various sensors to detect the location of the user. The most popular sensor-based system is Global Positioning Satellite (GPS). GPS systems are based on physical sensors and satellite infrastructure. This is useful for providing directions and traffic information, however, this solution is limited in environments where satellite signals are not detectable, such as in tunnels, underground, in large buildings, etc. Furthermore, this solution relies on special purpose hardware sensors that can be expensive.

Another solution to providing information about user location is to use an indoor location system. These systems work indoors by constructing a map of the location and using this map as a reference to locate the user in real time. This solution, however, requires that a pre-designed map be constructed for every location. Furthermore, there is no support for personalized location information for individual users in such systems.

Another solution to providing information about user location is to use a beacon-based system. This solution employs a database in the background containing hard coded information regarding locations and access points. The user's position is then detected using proximity to local access points. This solution, however, also is unable to support personalized location information for individual users.

In an embodiment of the present invention, personalized location identifiers are built for individual users. This may be achieved through passive observation of the user's everyday digital surroundings and then by forming unique identifiers for such surroundings in an online fashion. Through this process, location identifiers can be formed that are personal to each user without requiring prior knowledge about how many locations are important to the user. Location identifiers may also be formed without requiring special-purpose sensors for location identification and without requiring server-side support (e.g., database support). This solution also has lower overhead in terms of processing power and space as compared to other solutions and therefore is more suitable for online sensing and location identifying.

In an embodiment of the present invention, location recognition contains two phases: the signature formation phase and the signature matching phase. The signature formation phase processes log data and generates signatures for locations that are frequently visited by a user. Frequently visited locations may be identified and used for location identification from there on. The signature matching phase then involves determining whether the currently observed signature indicates a new location or a frequently visited location. If it matches a signature of a frequently visited location, the current location is identified. If the currently observed signature is a new location, the signature may be kept temporarily. If the frequency of encountering this new signature exceeds a defined threshold, it will be identified as a frequently visited location. Otherwise, it can be discarded or ignored.

An embodiment of the present invention employs the passive observations that can be performed from a user's device to collect data that can be used as identifiers for location. FIG. 1 is a block diagram illustrating an example architecture in accordance with an embodiment of the present invention. An environment sensor 100 is responsible for collecting information about detectable digital devices. Specifically, in one embodiment, the presence of wireless devices such as access points, ad-hoc wireless devices, and Bluetooth devices, may be detected. For example, a device held by a user as he walks into an office may detect several wireless access points, other employees' mobile devices, desktop computing components, etc.

The minimum information required from the detected devices are unique identifiers associated with the devices. Examples of such unique identifiers include, but are not limited to, Media Access Control (MAC) addresses for wireless access points and ad-hoc wireless devices, and Universal Unique Identifiers (UUIDs) for Bluetooth devices. The environment sensor may collect this information using wireless detector 102 and Bluetooth detector 104 periodically, and report the information (i.e., unique identifiers) to a signature manager 106.

The signature manager 106 stores the information given by the environment sensor in a device log 108, along with time information. The device log 108 holds the information seen through the user's device over a period of time, and can be optionally be cleaned/cleared after a pre-defined time period to save memory. The device log 108 can contain system generated identifiers, such as serial numbers, for the encountered devices, instead of storing the actual UUIDs or MAC addresses. The correspondence between the system generated serial numbers to the actual UUIDs or MAC addresses can then be stored separately within the log.

Figure 2:
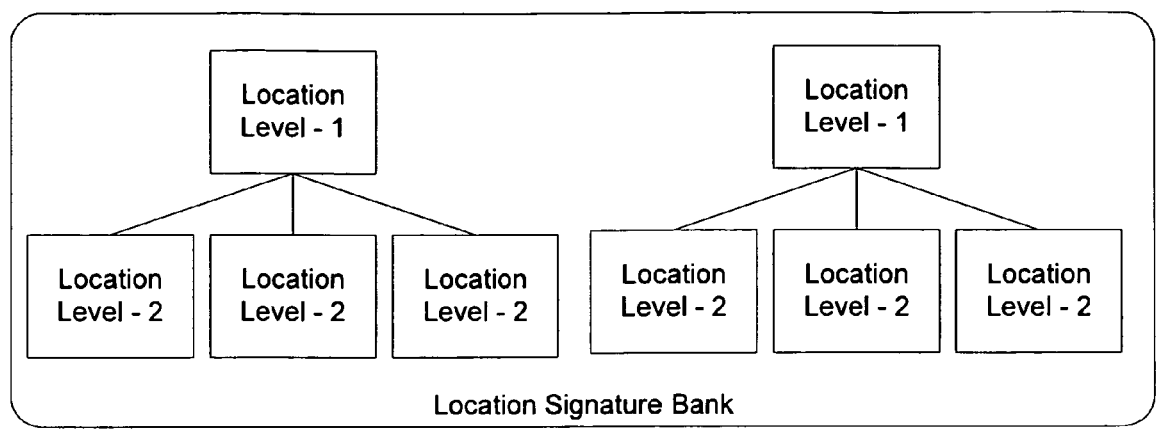
FIG. 2 is a diagram illustrating an example hierarchical signature structure in accordance with this embodiment of the present invention.

A signature generator 110 is responsible for inspecting the device log 108 and extracting identifiers that can uniquely identify user locations. It may implement a signature formation process that will be described in more detail below. A location signature bank 112 then stores the formed identifiers or location signatures. These signatures may be stored in a hierarchical manner within the location signature bank. This hierarchy represents the varying granularity of locations as represented by the signatures. The signatures stored higher in the hierarchy may represent larger locations, and the signatures stored lower in the hierarchy may represent smaller locations within the locations represented by their parents. In one embodiment, the hierarchy may be limited to two levels, with the higher level representing the location as determined through the WiFi access points, and the lower level storing signatures determined through Bluetooth device data. FIG. 2 is a diagram illustrating an example hierarchical signature structure in accordance with this embodiment of the present invention.

The hierarchy may also be divided according to reliability of the location determination. For example, WiFi signals may be have been deemed to be a more reliable indicator of user position than bluetooth device data. Hence, identifiers identified through WiFi signals may be placed at a higher level in the hierarchy. In an alternative example of the present invention, the access point to which the device connects can be used to determine which level in the hierarchy to which the signature will be associated. A signature containing an access point to which the device was connected can be placed at a higher level as compared to another signature that does not contain any access points to which the device had connected.

FIG. 3 is a table illustrating an example of system generated serial numbers of unique identifiers in accordance with an embodiment of the present invention. Here, the system generated serial numbers 300 are correlated with unique identifiers 302 (which may represent UUIDs and/or MAC addresses).

FIG. 4 is a table illustrating an example log as stored within a device log in accordance with an embodiment of the present invention. Here time code information 400 is stored along with the type of signal detected 402. The serial numbers of the devices detected 404. For another type of signal detected 406, additional serial numbers that are detected 408 are also provided.

Turning now to the signature formation process, wireless signals are collected in a periodic fashion and the signature formation procedure may also be executed periodically. At each step, a time period is considered for which all the data collected is inspected and the signatures are formed.

Based on the observed devices, the frequency of co-occurrence can be captured over a window of time though a co-occurrence matrix, where the length of the time window can be defined by the application needs. FIG. 5 is a diagram illustrating an example co-occurrence matrix in accordance with an embodiment of the present invention. This matrix is based on the data contained in the table of FIG. 4.

The co-occurrence matrix can capture the details of devices that are detected together, along with the strength (e.g., frequency of co-occurrences) of this evidence. The numbers shown along the principal diagonal 500 of the matrix (i,i) indicate the number of times each device was detected within the time window being considered. Individual cell entries in the table indicate the number of times the device at the ith row and the device at the jth column were seen together. For example, as can be seen from cell 502, device 102 was detected a total of 10 times in the considered time window. As can be seen from cell 504, devices 102 and 116 were detected together 6 times in the considered time window.

A procedure may then be used to extract the identifier that can be employed as a signature for the location based on the co-occurrence matrix. The extraction of such an identifier may be based on a pre-defined threshold that can be heuristically chosen based on the time window over which the log is being inspected. For example, for shorter windows (e.g., on the order of minutes), the threshold could be 80%, while for longer time periods (e.g., on the order of hours), the threshold could be 25%. This may be heuristically determined based on the assumption that a user tends to stay in the same location during a short time period, and therefore a large percentage of the detected devices remain the same. In a longer period, on the other hand, the user might have visited several locations, and therefore only a small portion of the detected devices remain the same.

Figure 6:
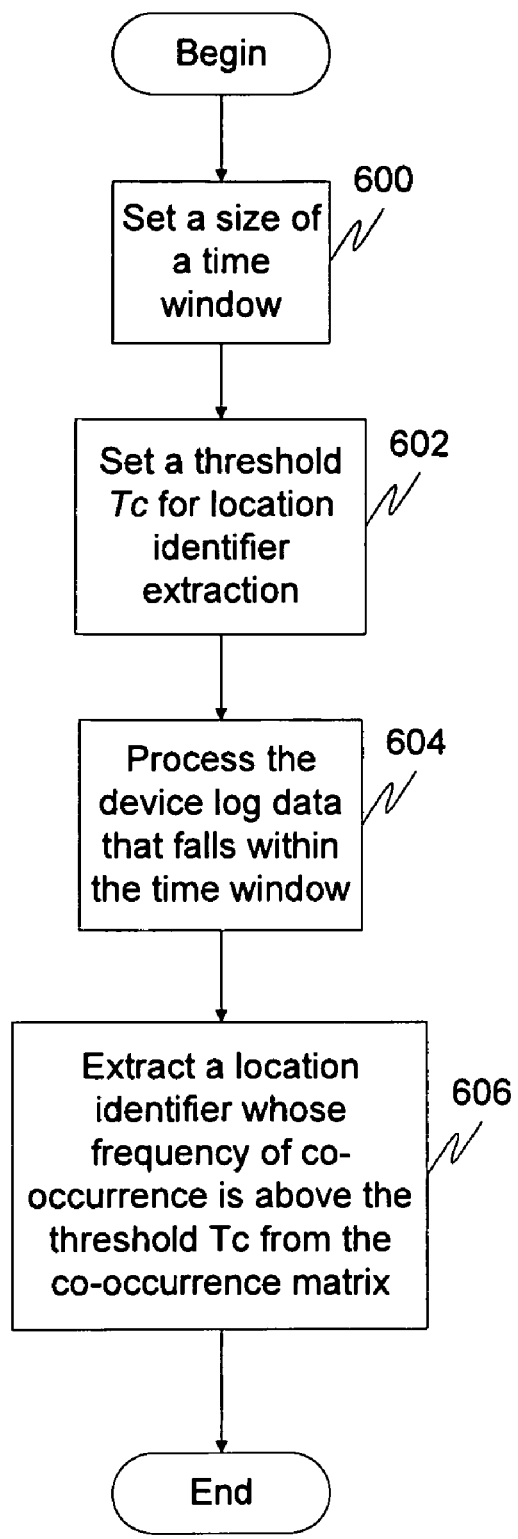
FIG. 6 is a flow diagram illustrating a method for forming a signature in accordance with an embodiment of the present invention.

FIG. 6 is a flow diagram illustrating a method for forming a signature in accordance with an embodiment of the present invention. At 600, a size of a time window may be set. At 602, a threshold $T_c$ for location identifier extraction may be set. At 604, the device log data that falls within the time window may be processed to produce a co-occurrence matrix. At 606, a location identifier whose frequency of co-occurrence is above the threshold $T_c$ may be extracted from the co-occurrence matrix.

Figure 7:
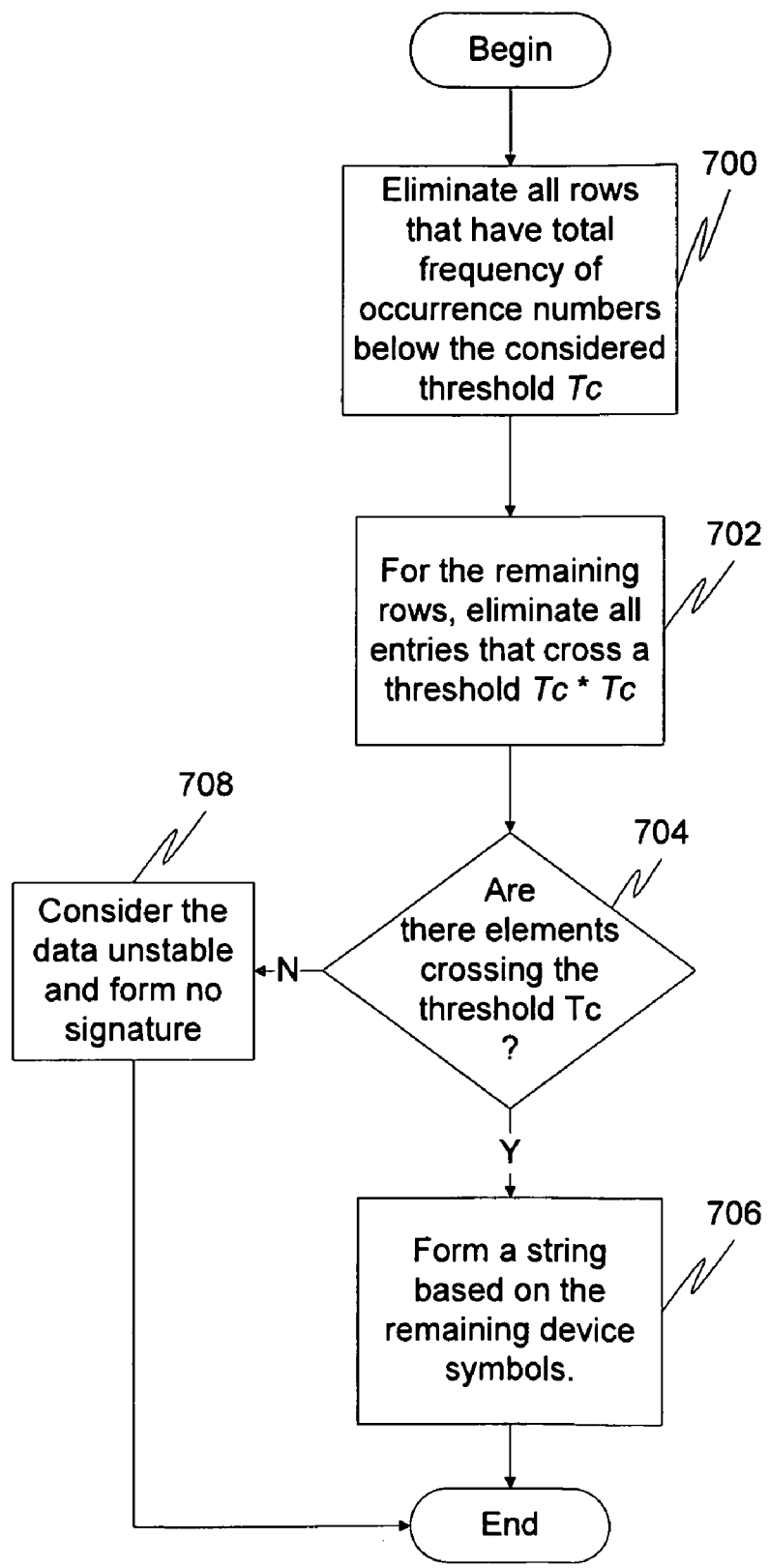
FIG. 7 is a flow diagram illustrating a method for extracting a location identifier from a co-occurrence matrix in accordance with an embodiment of the present invention.

FIG. 7 is a flow diagram illustrating a method for extracting a location identifier from a co-occurrence matrix in accordance with an embodiment of the present invention. At 700, all rows that have total frequency of occurrence numbers (the values on the principal diagonal) below the considered threshold $T_c$ are eliminated. At 702, for the remaining rows, all entries that cross a threshold $T_c*T_c$ may be eliminated. The threshold here is $T_c*T_c$ to capture the co-occurrence relationship. At 704, it may be determined if there are elements crossing the threshold $T_c$. If so, then at 706 a string is formed based on the remaining device symbols. This string can then be used as a location identifier (signature). If there are no elements crossing the threshold $T_c$, then at 708 the data is considered unstable and no signature is formed. It should be noted that this is merely an example procedure. Other types of procedures may be used, such as one where $2*T_c$ is used instead of $T_c*T_c$.

Figure 8:
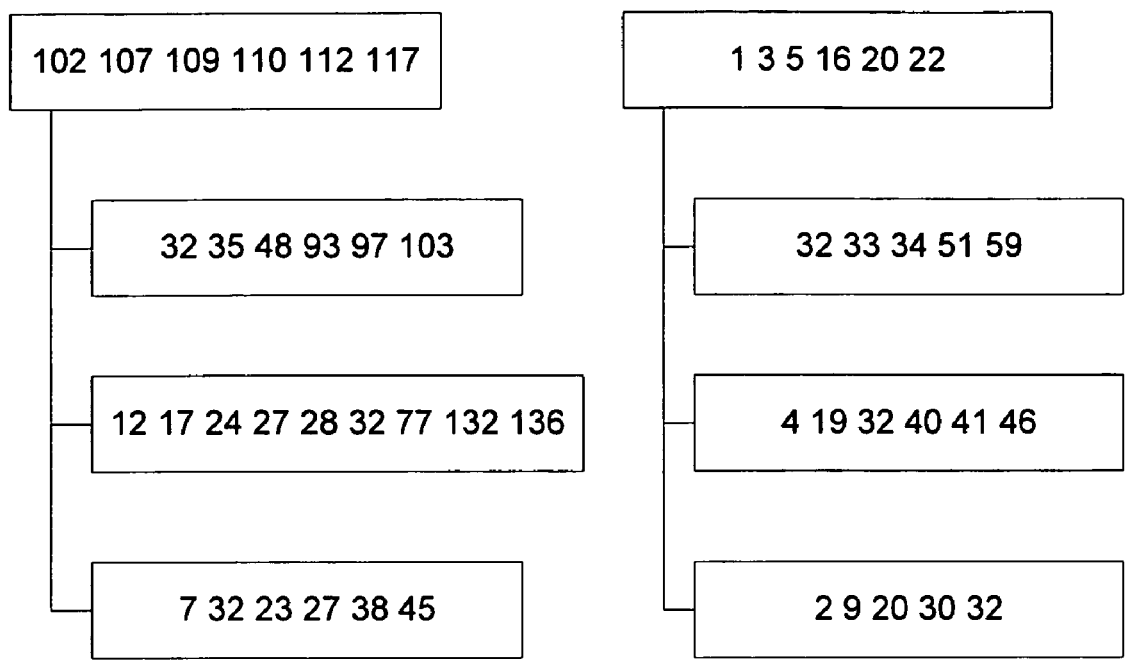
FIG. 8 is a diagram illustrating an example of hierarchical signatures in accordance with an embodiment of the present invention.

Thus, from the table of FIG. 5, the extracted signature for a threshold of 80% is 102 107 109 110 112 117. The co-occurrence threshold $T_c*T_c$ is 64%. The signature formed with the WiFi data may then be stored in the first level of the signature hierarchy in the location signature bank. At the second level, the signature generated on the Bluetooth data at the same location is stored. FIG. 8 is a diagram illustrating an example of hierarchical signatures in accordance with an embodiment of the present invention. The procedure outlined above for constructing the co-occurrence matrix and extracting the unique identifier is repeated for the Bluetooth devices, although the considered threshold can be different. For example, Bluetooth devices have a lower visibility range as compared to the WiFi devices, hence the threshold may be lower. The formed identifiers (signatures) can be used together or separately, depending upon intended use.

Later, when a device needs to know its location, the collected data within the time window is inspected with the above procedure to extract the signature. The signature is thus extracted and then compared with the signatures stored in the location signature bank to see if the location was already captured. There are a number of different ways that matching can be determined. In one embodiment, the matching process uses a threshold to determine if the stored signature matches the currently formed signature or not. The matching process first computes the match-ratio of the two signatures by comparing the signatures and computing a ratio (or percentage) of the device IDs that are identical to the total number of unique device IDs. This threshold may be set based on heuristics (e.g., the match threshold $T_M$ could be set at 60%). The matching itself may then be performed as a simple string comparison.

Figure 9:
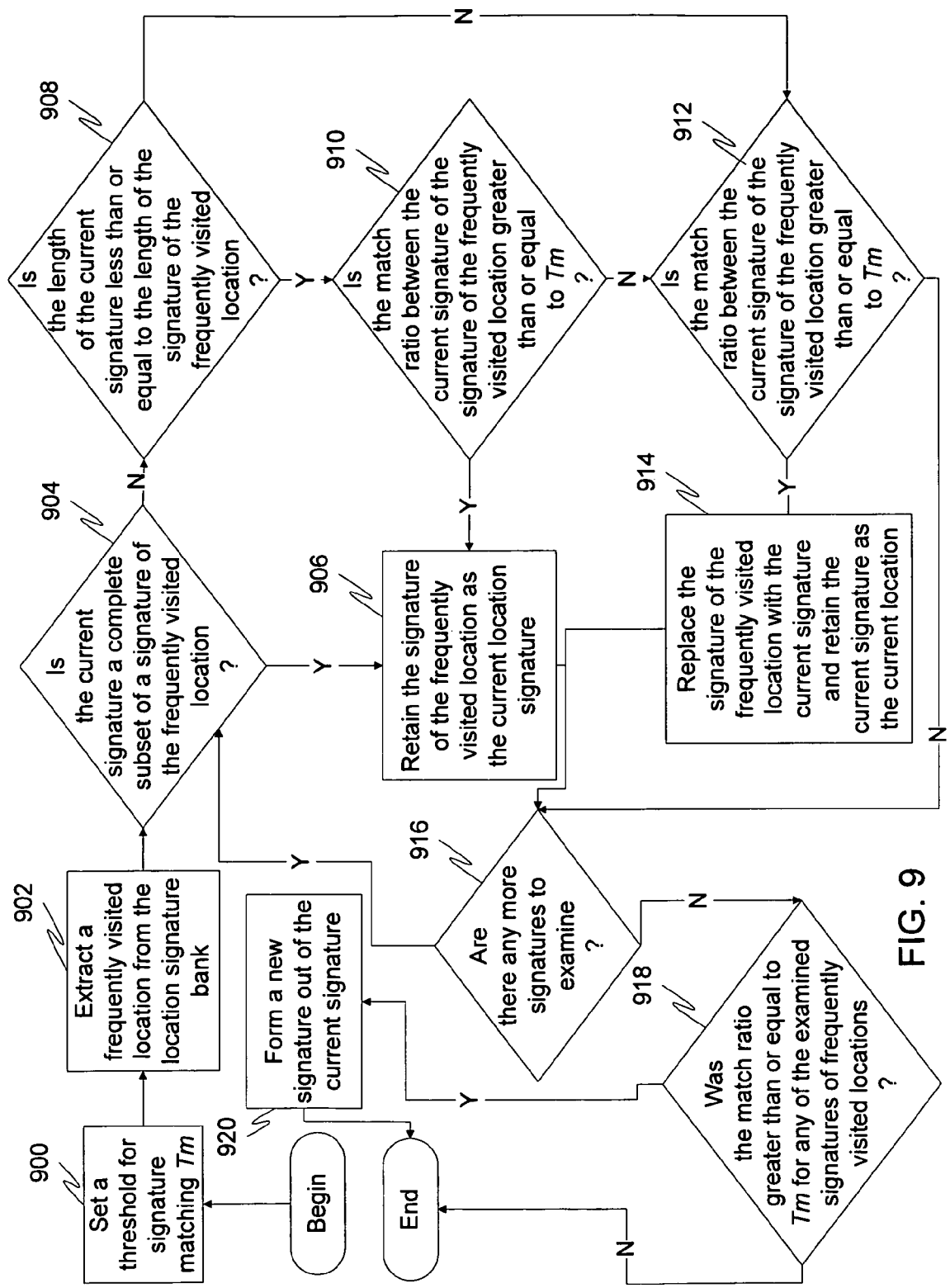
FIG. 9 is a flow diagram illustrating a method for matching signatures in accordance with an embodiment of the present invention.

FIG. 9 is a flow diagram illustrating a method for matching signatures in accordance with an embodiment of the present invention. At 900, a threshold for signature matching $T_M$ is set. At 902, a first frequently visited location is extracted from the location signature bank. A loop may then be begun to attempt to match one or more frequently visited locations extracted from the location signature bank. In some embodiments, this may involve looping through all the frequently visited locations in the signature bank, but in other embodiments only some of the frequently visited locations may be examined. At 904, it is determined if the current signature is a complete subset of a signature of the frequently visited location. If so, then at 906, the signature of the frequently visited location is retained as the current location signature. If not, then at 908, it is determined if the length of the current signature is less than or equal to the length of the signature of the frequently visited location. If so, then at 910, it is determined if the match ratio (the percentage of device IDS that are identical among the two signatures being compared) is greater than or equal to $T_M$. If so, then the signature of the frequently visited location is retained as the current location signature at 906.

If at 908 it was determined that the length of the current location is greater than the length of the signature of the frequently visited location, then at 912, it is determined if the match ratio is greater than or equal to $T_M$. If so, then at 914, the signature of the frequently visited location is replaced with the current signature and the current signature is retained as the current location. This case indicates that the signature for a frequently visited location has changed. At 916, it is determined if there are any more signatures of frequently visited locations to examine. If so, then the process is then repeated for the next signature of a frequently visited location in the signature bank by looping back to 904. If not, then at 918 it is determined if the match ratio was greater than or equal to $T_M$ for any of the examined signatures of frequently visited locations. If not, then at 920 a new signature is formed out of the current signature. This signature may then be stored temporarily until the same signature is observed multiple times, at which point it may be graduated as the signature of a frequently visited location. How many times a signature must be observed before it may join the rank of a frequently visited location is something that can be set by a user or administrator.

In an alternative embodiment, the signature formation process may be enhanced by using a variable weighting scheme. Since the range of devices can vary, a variable weighting scheme can enhance the accuracy of location recognition. Based on the knowledge about the range of devices, different weights can be considered on different parts of the collected data, and the signatures for these portions can be formed independently. The signatures formed independently can then be either combined to indicate a location, or can be considered separately. For example, it is possible to gather information such as the class of a Bluetooth device. The class of a Bluetooth device typically indicates whether the device is a server, a laptop, a personal data assistant, etc. The classes are designed primarily to indicate the capabilities of the device, but an embodiment of the present invention can utilize the class information as an indicator of the range of the corresponding device. Based on such information, the values in the co-occurrence matrix can be modified according to pre-selected weights for the classes.

In another alternative embodiment, offline signature correction may be corrected. In the previously described embodiments, the signature formation was specific to the online formation of signatures. The data considered was based on the most recent "n" time units at the instance when the signature is formed. Since the formation of the signature in the online process us based purely on past history, there is a possibility that the signatures are not yet mature at the time of formation. In the alternative embodiment, the signatures formed online can be corrected offline (for example, once a day). When looking at the data in an offline fashion, the time window can be centered around a time instance, and the formed signatures can be inspected not only with data from the past "n" time units, but also based on data for the next "n" time units. Further the data window itself can be stretched or shrunk in an adaptive manner (e.g., based on the stability of the signatures).

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for forming location signatures for a device, the method comprising:
   retrieving information regarding one or more digital devices detected around the device during a first set time period;
   creating a first signature for a location based on information regarding the one or more digital devices detected during the first set time period; and storing the first signature in hierarchical fashion in a location signature bank, wherein top levels of the location signature bank represent signatures that are more reliable indications of locations, and lower levels of the location signature bank represent signatures that are less reliable indications of locations.

2. The method of claim 1, further comprising:
   detecting one or more digital devices around the device during a second set time period;
   creating a second signature for a location based on information regarding the one or more digital devices around the device during the second set time period;
   comparing the first signature to the second signature to determine if the signatures match; and
   if the signatures match, accepting the second signature as an identification of a location of the device.

3. The method of claim 2, wherein the comparing includes:
   determining the match ratio of digital device identifiers in the first and second signatures that are shared between the first and second signatures; and
   determining that the first and second signatures match if the match ratio is greater than or equal to a match threshold.

4. The method of claim 2, further comprising:
   if the signatures match:
   determining if the length of the second signature is greater than the length of the first signature; and
   replacing the first signature in a signature storage with the second signature if the length of the second signature is greater than the length of the first signature.

5. The method of claim 1, wherein the creating includes:
   (a) considering identification symbols for each of the one or more digital devices detected around the device during the first set time period from consideration;
   (b) eliminating any identification symbols for digital devices that have a frequency of occurrence during the first set time period that is less than a threshold $T_c$;
   (c) for each remaining identification symbol $s_i$ after step (b), extracting any identification symbols for digital devices whose frequency of co-occurrence with the identification symbol $s_i$ is at or above the threshold $T_c * T_c$;
   (d) forming a signature from any identification symbol extracted after step (c).

6. The method of claim 5, wherein the signature is a concatenated string of the remaining identification symbols.

7. The method of claim 5, further comprising:
   assigning weights to the frequencies of co-occurrence, wherein the weights are assigned based on reliability of information regarding co-occurrence of the underlying digital devices.

8. The method of claim 7, wherein the weights are assigned based on device class.

9. The method of claim 1, wherein the creating includes:
   (a) constructing a co-occurrence matrix for the first set time period using the information regarding one or more digital devices detected around the device during the first set time period, wherein the co-occurrence matrix contains identifiers, for each of the digital devices detected around the device during the first set time period, in the same positions on each axis such that the entries on the diagonal of the matrix represent the frequency of occurrence of the digital device for the corresponding identifier during the first set time period, and entries off the diagonal in the ith row and jth column of the matrix represent the number of times the device at the ith row co-occurred with the digital device at the jth column;

(b) eliminating any rows that have values on the diagonal of less than a threshold $T_c$;

(c) for each remaining row after step (b), extracting any identification symbols corresponding to entries in the matrix having values at or above the threshold $T_c*T_c$;

(d) forming a signature from any identification symbol extracted after step (c).

10. The method of claim 1, further comprising:
storing the first signature in a signature hierarchy, wherein top levels of the signature hierarchy represent larger locations, and lower levels of the signature hierarchy represent smaller locations.

11. The method of claim 1, further comprising:
re-evaluating the signature based upon information regarding one or more digital devices detected around the device during a time period after the first set time period.

12. An apparatus comprising:
an environment sensor designed to detecting one or more digital devices around the apparatus;
a location signature bank; and
a signature manager coupled to the environment sensor and the location signature bank, wherein the signature manager is designed to store information received from the environment sensor in a device log, generate signatures for locations based on the information, and store the generated signatures in the location signature bank in a hierarchical fashion, with top levels of the hierarchy representing signatures that are more reliable indications of locations and lower levels of the signature hierarchy representing signatures that are less reliable indications of locations.

13. The apparatus of claim 12, wherein the apparatus is a mobile device.

14. The apparatus of claim 12, wherein the environment sensor includes a wireless detector and a Bluetooth detector.

15. A system for forming location signatures for a device, the system comprising:
means for retrieving information regarding one or more digital devices detected around the device during a first set time period;
means for creating a first signature for a location based on information regarding the one or more digital devices detected during the first set time period; and
means for storing the first signature in hierarchical fashion in a location signature bank, wherein top levels of the location signature bank represent signatures that are more reliable indications of location, and lower levels of the location signature bank represent signatures that are less reliable indications of locations.

16. A program storage device readable by a machine tangibly embodying a program of instructions executable by the machine to perform a method for forming location signatures for a device, the method comprising:
retrieving information regarding one or more digital devices detected around the device during a first set time period;
creating a first signature for a location based on information regarding the one or more digital devices detected during the first set time period; and
storing the first signature in hierarchical fashion in a location signature bank, wherein top levels of the location signature bank represent signatures that are more reliable indications of locations, and lower levels of the location signature bank represent signatures that are less reliable indications of locations.

17. A method for forming location signatures for a device, the method comprising:
retrieving information regarding one or more digital devices detected around the device during a first set time period; and
creating a first signature for a location based on information regarding the one or more digital devices detected during the first set time period, wherein the creating includes:
(a) considering identification symbols for each of the one or more digital devices detected around the device during the first set time period from consideration;
(b) eliminating any identification symbols for digital devices that have a frequency of occurrence during the first set time period that is less than a threshold $T_c$;
(c) for each remaining identification symbol $s_i$ after step (b), extracting any identification symbols for digital devices whose frequency of co-occurrence with the identification symbol $s_i$ is at or above the threshold $T_c*T_c$; and
(d) forming a signature from any identification symbol extracted after step (c).

18. A method for forming location signatures for a device, the method comprising:
retrieving information regarding one or more digital devices detected around the device during a first set time period; and
creating a first signature for a location based on information regarding the one or more digital devices detected during the first set time period, wherein the creating includes:
(a) constructing a co-occurrence matrix for the first set time period using the information regarding one or more digital devices detected around the device during the first set time period, wherein the co-occurrence matrix contains identifiers, for each of the digital devices detected around the device during the first set time period, in the same positions on each axis such that the entries on the diagonal of the matrix represent the frequency of occurrence of the digital device for the corresponding identifier during the first set time period, and entries off the diagonal in the ith row and jth column of the matrix represent the number of times the device at the ith row co-occurred with the digital device at the jth column;
(b) eliminating any rows that have values on the diagonal of less than a threshold $T_c$;
(c) for each remaining row after step (b), extracting any identification symbols corresponding to entries in the matrix having values at or above the threshold $T_c*T_c$; and
(d) forming a signature from any identification symbol extracted after step (c).

* * * * *